No. 816,281. PATENTED MAR. 27, 1906.
G. W. VAN SANT.
ICE SHAVING MACHINE.
APPLICATION FILED MAR. 6, 1905.
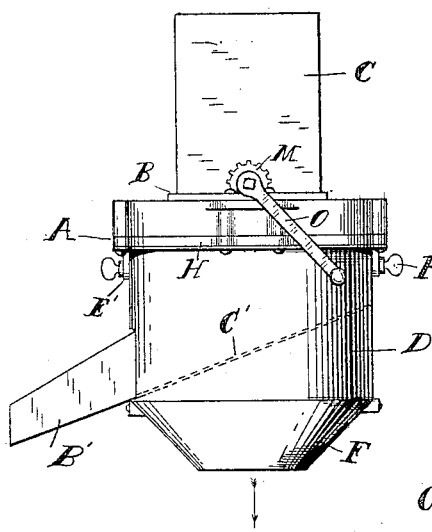
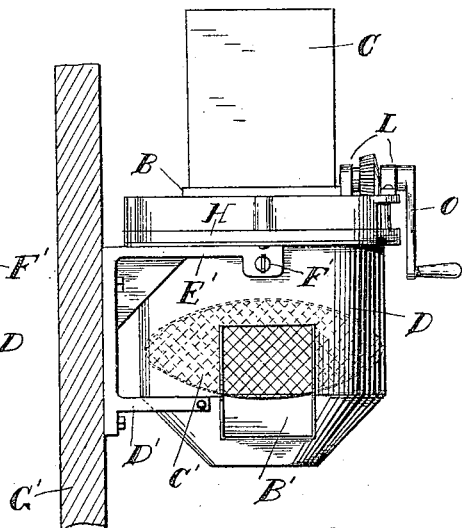
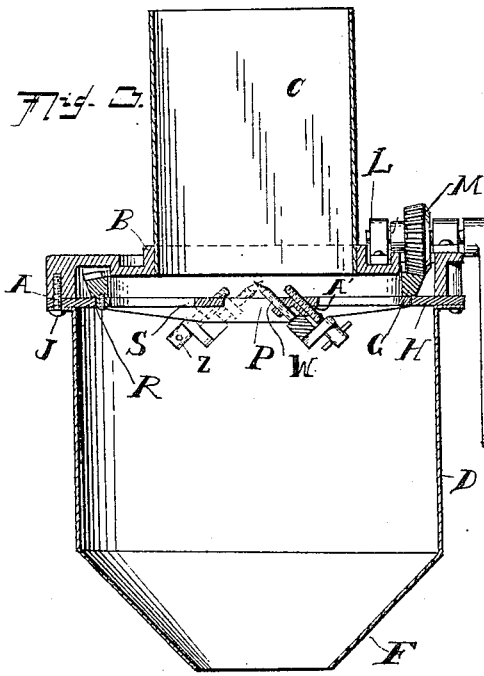
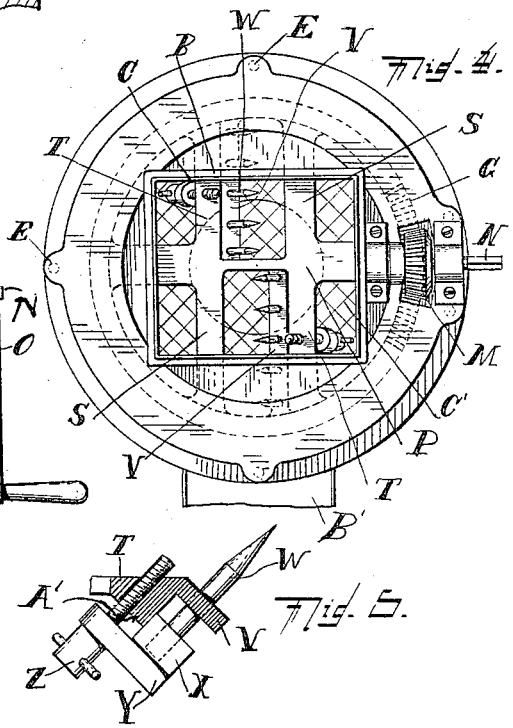
Witnesses
John J. Mulvaney
Katie Strehli
Inventor
George W. Van Sant
by Jno. W. Strehli
Attorney

UNITED STATES PATENT OFFICE.

GEORGE W. VAN SANT, OF BELLEVUE, KENTUCKY.

ICE-SHAVING MACHINE.

No. 816,281.   Specification of Letters Patent.   Patented March 27, 1906.

Application filed March 6, 1905. Serial No. 248,764.

*To all whom it may concern:*

Be it known that I, GEORGE W. VAN SANT, a citizen of the United States, residing at the town of Bellevue, in the county of Campbell and State of Kentucky, have invented certain new and useful Improvements in Ice-Shaving Machines, of which the following is a specification.

The object of my invention is to produce a cheap simple efficient portable machine for shaving or cutting ice into small pieces or particles.

It belongs to that class of ice-shaving machines in which a revolving spider or carrier carries knives, picks, or teeth to shave or cut the ice, which is fed down onto the teeth through a hopper.

One of the main features of the invention consists in providing means for adjusting the teeth so that any desired depth of cut into the ice can be attained.

In the accompanying drawings, forming part of this specification, Figure 1 is a side elevation of my ice-shaving machine. Fig. 2 is a front elevation of my shaving-machine. Fig. 3 is a central longitudinal section of the machine. Fig. 4 is a top view of the machine. Fig. 5 is a detached view of part of the machine.

A represents a circular framework having a square center B, to which center B a hopper C is attached in any suitable way. This circular framework A is a casting, which can of course be made of any desired shape or contour.

D represents a cylinder attached to the casting A by screws E. It may be attached in any other manner. The cylinder D is contracted at its lower end to form a funnel or spout F. In this framework A, I secure a large skeleton gear-wheel G, held in place by a ring H, which is attached to framework A by screws J. A short shaft N, suitably attached to the framework A by journal-boxes L, carries a small gear-wheel M. The shaft N, to which the gear-wheel M is attached, extends out to receive the handle O.

P represents a revolving spider, either made in one piece with the gear-wheel G or separate therefrom and screwed thereto by screws R. (See Fig. 3.) This revolving spider P is a casting, annular in form, arms, as S, extending across it from one side to the other. On two of these arms, which I shall designate T, I provide a bar V, made integral with said arm T, provided with a series of holes through which pass teeth W. This bar V may be said to be a guide-bar for said teeth W. It projects from the arm T at an angle, so that the teeth will properly pass through it to do their work. The tooth-holding arm is designated by the letter X. To it the teeth W are fastened in any suitable manner. This tooth-bar X has attached to it at its center a lug Y, through which passes an adjusting-screw Z. This adjusting-screw Z also passes into and through a lug A' on the arm T and through said arm. (See particularly Fig. 5.) By screwing this adjusting-screw Z in the proper direction the bar X, carrying the knives and the lug Y, moves up or down, thus allowing the teeth W to extend inward to a greater or less extent to make cuts of varying depth in the ice. These arms T are the same as the arms S, only they carry the peculiar construction shown in Fig. 5. In the present instance I use two sets of this construction for holding and operating the teeth. They are on opposite sides of the spider P and at the ends of the spider extending inward until the innermost tooth of each set reaches a point which will leave a space between these teeth the same as is left between the other teeth. I may provide teeth and connections at any other point on the spider, if desired. It will be seen that the teeth extend up at about an angle of forty-five degrees. They may, however, extend up at any angle desired.

To the cylinder D, I attach a spout B' of any suitable shape and construction. In this cylinder I also set at an angle a screen C', which has a mesh of any desired size. The larger particles of ice or pieces which break off do not pass through the screen, as do the smaller particles, but strike the screen C' and roll off and out through the spout B' into some receptacle placed there to receive them.

By means of a bracket D' E' F' the device is secured to the wall or partition G'. (See Fig. 2.)

The device operates as follows, to wit: A piece of ice is put into the hopper C, the bottom of the ice resting on the spider or carriage P. The handle O is turned by the operator, thus imparting motion to the shaft N, and the gear-wheel M being attached to said shaft motion is imparted to said gear, the teeth of which mesh with the teeth of the gear-wheel G, which gear-wheel G being attached to carriage or spider P motion is imparted to the said spider P. The knives or picks W being attached to said revolving carriage, the ice is cut, chipped, or shaved by said cutters or picks W coming in contact therewith as the carriage or spider P revolves. The ice is cut quickly, evenly, and uniformly, falling through the screen C', through funnel F, into any receptacle placed under the machine, any large pieces of ice striking the screen C' and rolling out through spout B'. By adjusting the picks W upward or downward a cut of varying degrees of depth can be made.

I usually place four or five teeth on the bar which supports them, but may increase or diminish that number, as desired. I may use as many series of these bars and teeth as desired.

The spider or carriage may be differently formed and may be supported in any desired manner.

What I claim as new and of my invention, and desire to secure by Letters Patent, is—

1. In an ice-shaving machine, a framework, a carriage, said carriage mounted to revolve in said framework, cutting-knives, said cutting-knives attached to said carriage, and disposed on opposite sides thereof, a bar carrying said knives, the knives passing through a guide-bar permanently attached to the carriage, means for moving said knives up and down in said guide-bar, the points of each set of knives extending up at an angle and in opposite positions so that continuous cutting is produced, in combination with means for revolving said carriage, all combined and operating as set forth.

2. In an ice-shaving machine, a framework, a carriage, said carriage mounted to revolve in said framework, cutting-knives, said cutting-knives attached to said carriage and disposed on opposite sides thereof, means for adjusting said knives on said carriage, a guide-bar, said knives passing through said guide-bar for adjustment, in combination with means for revolving said carriage, a hopper for holding the ice, a cylinder lying below said framework, a screen in said cylinder, said screen being removable, said screen sifting the shaved ice and holding the particles which are too large, a spout for removing said large particles, all combined and operating as set forth.

GEORGE W. VAN SANT.

Witnesses:
JOHN J. MULVANEY,
CHRISTIAN SCHAUB.